(12) United States Patent
French

(10) Patent No.: US 8,736,914 B2
(45) Date of Patent: May 27, 2014

(54) IMAGE SCANNING APPARATUS AND METHODS OF USING THE SAME

(71) Applicant: RJS Technologies, Inc., Minneapolis, MN (US)

(72) Inventor: Christopher Ian French, Plymounth, MN (US)

(73) Assignee: RJS Technologies, Inc., Minneapolis, MN (US)

( * ) Notice: Subject to any disclaimer, the term of this patent is extended or adjusted under 35 U.S.C. 154(b) by 0 days.

(21) Appl. No.: 13/731,757

(22) Filed: Dec. 31, 2012

(65) Prior Publication Data

US 2013/0182294 A1    Jul. 18, 2013

Related U.S. Application Data

(60) Provisional application No. 61/586,098, filed on Jan. 12, 2012.

(51) Int. Cl.
*H04N 1/024* (2006.01)
*H04N 1/04* (2006.01)
*G06K 15/10* (2006.01)
*G06K 7/10* (2006.01)
*G06K 7/14* (2006.01)
*G06K 9/22* (2006.01)
*G06K 9/20* (2006.01)

(52) U.S. Cl.
USPC ....... 358/473; 358/1.8; 358/474; 235/462.01; 235/454; 382/313; 382/321

(58) Field of Classification Search
CPC ......... G06K 7/14; G06K 7/108; G06K 7/107; G06K 7/106; G06K 7/105; G06K 9/209; G06K 7/1417; B41J 3/36; G06Q 30/00; H04N 1/00002

USPC .............. 358/473, 1.8, 474; 235/462.01, 454; 382/313, 321

See application file for complete search history.

(56) References Cited

U.S. PATENT DOCUMENTS

| | | | | |
|---|---|---|---|---|
| 5,023,922 | A * | 6/1991 | Abramovitz et al. | 382/313 |
| 5,804,805 | A * | 9/1998 | Koenck et al. | 235/462.01 |
| 5,969,321 | A * | 10/1999 | Danielson et al. | 235/462.01 |
| 6,889,903 | B1 * | 5/2005 | Koenck | 235/462.01 |
| 8,600,196 | B2 * | 12/2013 | King et al. | 382/313 |
| 2002/0117547 | A1 * | 8/2002 | Krichever | 235/462.01 |
| 2003/0029915 | A1 * | 2/2003 | Barkan et al. | 235/454 |
| 2008/0144053 | A1 * | 6/2008 | Gudan et al. | 358/1.8 |

* cited by examiner

*Primary Examiner* — Charlotte M Baker
*Assistant Examiner* — Ruby Grisham
(74) *Attorney, Agent, or Firm* — McDermott Will & Emery LLP

(57) ABSTRACT

An image scanning apparatus includes a housing. A first image sensor (linear scan imager) is attached at a first position along the housing. The first image sensor is configured and adapted to scan an image. A second image sensor (area scan imager) is attached at a second position along the housing. The second image sensor is configured and adapted to scan an image to detect movement of the apparatus in the X and Y axis. Movement in the Y axis of the apparatus as detected by the second image sensor is utilized to trigger the first image sensor. Movement in the X axis of the apparatus as detected by the second image sensor is utilized to correct image defects (e.g. skew) of the image captured by the first image sensor thereby allowing the second image sensor to capture a 2D inspection area.

32 Claims, 9 Drawing Sheets

IMAGE SCANNING APPARATUS AND METHODS OF USING THE SAME

RELATED APPLICATIONS

The present application claims the benefit of co-pending U.S. Provisional Patent Application No. 61/586,098, filed Jan. 12, 2012, the entire contents of which is incorporated herein by reference.

FIELD OF THE INVENTION

The present invention relates to the field of image scanning and processing and, more particularly, to the use of image scanning and processing in the area of image verification and quality testing.

BACKGROUND

Barcodes are used throughout supply chains to identify objects, collect data about objects, and enter data into computer systems. There are many different types of barcodes, but can generally group them into two categories: Linear, or one-dimensional barcodes, and 2D or two-dimensional barcodes. One dimensional barcodes provide information along one axis, similar to a standard alphanumeric sentence. Two dimensional barcodes provide information along two axes, similar to a matrix. Regardless of the type of bar code used, to maintain the integrity of a barcode system, the barcodes in use must be of sufficient quality such that barcode readers can decipher them. Accordingly, users of barcodes have created standards bodies that have promulgated various standards to insure that barcodes meet certain quality requirements.

Barcode verification is the process by which barcodes are examined to determine whether or not barcodes meet industry standards. Barcode verifiers are used to perform barcode verification by taking an image of the barcode and performing various tests on it. This process is outlined in barcode verifier standards ISO/IEC 15416:2000 (for linear bar code verifiers) and ISO/IEC 15415:2004 (for two dimensional bar code verifiers), both publications of which are hereby incorporated by reference. Other technical standards that are relevant to bar codes and to the present application are ISO/IEC15426-1: 2006, ISO/IEC15426-2:2005, ISO 15394:2000(E), ATA SPEC 2000, NDC 2001, MIL-STD-130L, and the GS1 General Specifications, all of which are hereby incorporated by reference.

When using a handheld barcode verifier, it is necessary for the user to scan the verifier across the barcode in order to obtain the image. For linear barcode verification, this is relatively straightforward because the information is only provided along the X axis. Any defect in the image along the Y axis (e.g. skewing of the image due to the user's hand movement) will not, to any large degree, affect the verifier's ability to accurately verify the barcode. With respect to two dimensional barcodes, however, it is important that the barcode image not contain defects along the Y axis. Furthermore, due to the more dense nature of two dimensional barcodes, it is important that the barcode verify have sufficient resolution that it captures a sufficient amount of the barcode that verification can occur. Most two-dimensional barcode verifiers rely on an area scan camera which is expensive and requires multiple lenses to inspect various sizes of bar codes. In order to have sufficient resolution of small bar codes, a lens will be required that zooms in on the barcode sample while different lenses will be required for medium and large bar codes. The image scanning apparatus and methods of the present application provide the ability to capture any common sized linear or two-dimensional without changing lenses or reconfiguring the barcode verifier.

SUMMARY

The description and drawings herein are meant as an illustration of one or more exemplary embodiments of the invention, but should not be considered limiting or restrictive. As such, there are a number of manners of modification without departing from the spirit and scope of the invention.

In one exemplary embodiment, an image scanning apparatus is provided. The image scanning apparatus includes a housing. A first image sensor is attached at a first position along the housing. The first image sensor is configured and adapted to scan an image. A second image sensor is attached at a second position along the housing. The second image sensor is configured and adapted to scan an image to detect movement of the apparatus in the X and Y axis. The movement in the Y axis of the apparatus as detected by the second image sensor is utilized to trigger the first image sensor. In one embodiment the first image sensor is a one-dimensional image sensor. In one embodiment, the second image sensor is a two-dimensional image sensor. In one embodiment, the second image sensor is an area scan image sensor. In one embodiment, an illumination source is associated with the first imaging sensor. In one embodiment, an illumination source is associated with the second imaging sensor. In one embodiment, at least one aperture is associated with the first and second imaging sensor. In one embodiment, the aperture may be an optical aperture. In one embodiment, the aperture may be a software aperture. In one embodiment, the aperture may be a combination software and optical aperture. In one embodiment, the at least one aperture is a variable aperture. In one embodiment, the housing is a sealed unit containing the first and second image sensors.

In one exemplary embodiment, an image scanning apparatus is provided. The image scanning apparatus includes a housing. A first image sensor is attached at a first position along the housing. The first image sensor is configured and adapted to scan an image. A second image sensor is attached at a second position along the housing. The second image sensor is configured and adapted to scan an image to detect movement of the apparatus in the X and Y axis. The movement in the Y axis of the apparatus as detected by the second image sensor is utilized to trigger the first image sensor. At least one aperture is along a portion of the housing. The at least one aperture is associated with the first image sensor and a second aperture is associated with the second image sensor. At least one illumination source is attached to the housing and is associated with the first image sensor and a second illumination source is associated with the second image sensor. In one embodiment, the first image sensor is a one-dimensional image sensor. In one embodiment, the first image sensor is a linear image sensor. In one embodiment, the second image sensor is a two-dimensional image sensor. In one embodiment, the second image sensor is an area scan image sensor.

In one exemplary embodiment, an image scanning apparatus is provided. The image scanning apparatus includes a housing. A first image sensor is attached at a first position along the housing. The first image sensor is configured and adapted to scan an image. A second image sensor is attached at a second position along the housing. The second image sensor is configured and adapted to scan an image to detect movement of the apparatus in the X and Y axis. The movement in the Y axis of the apparatus as detected by the second image sensor is utilized to trigger the first image sensor. The image from the one-dimensional image sensor is adjusted to correct any deviation found in the X axis. In one embodiment, the amount of deviation in the X axis against a maximum deviation limit is compared; and an alert is generated if the amount of deviation exceeds the maximum deviation limit. In one embodiment, the first image sensor is a one-dimensional image sensor. In one embodiment, the first image sensor is a linear image sensor. In one embodiment, the second image sensor is a two-dimensional image sensor. In one embodiment, the second image sensor is an area scan image sensor.

In one exemplary embodiment, a method is provided. An image is scanned by a first image sensor to obtain an uncorrected scanned image. The image is scanned by a second image sensor to obtain a distance of scan and skew profile of the first scanned image. The sequential scanned images are scanned by the second image sensor to collect the skew data to yield a skew deviation. In one embodiment, the skew deviation is compared against a maximum deviation limit and an alert is generated if the skew deviation exceeds the maximum deviation limit. In one embodiment, the first image sensor uncorrected scanned image is adjusted by the skew deviation to yield a corrected scanned image.

In one embodiment, an image scanning device is provided. The image scanning device includes a housing. A scanning module is attached to the housing. The image scanning module is operative to scan an image that is utilized to represent a data value. An encoding module is configured to decode the scanned image to yield data about the image. An image verification module is configured to utilize the data to verify that the image accurately reflects the data value. The image is one of a one-dimensional and two-dimensional barcode and the image verification module is operable to verify accuracy of both one-dimensional and two-dimensional barcodes.

In one embodiment, an image scanning device is provided. The image scanning device includes a housing with an image scanning module attached to the housing. The image scanning module is operative to scan an image that is utilized to represent a data value. A decoding module is configured to decode the scanned image to yield data about the image. An image verification module is configured to utilize the data to verify that the image accurately reflects the intended data value. The image scanning module comprises an adaptable aperture a size of which the image scanning module configures in response to the data about the image. In one embodiment, the image s data about the image is dimension data.

The present invention is capable of various modifications and alternative constructions, some of which are detailed in the drawings below. However, it should be clear that the intention is not to limit the invention to a particular embodiment or form, but rather the present invention should cover changes, additions and modifications as part of its scope. Independent features and independent advantages of the present invention will become apparent to those skilled in the art upon review of the detailed description and drawings.

Figure 1:
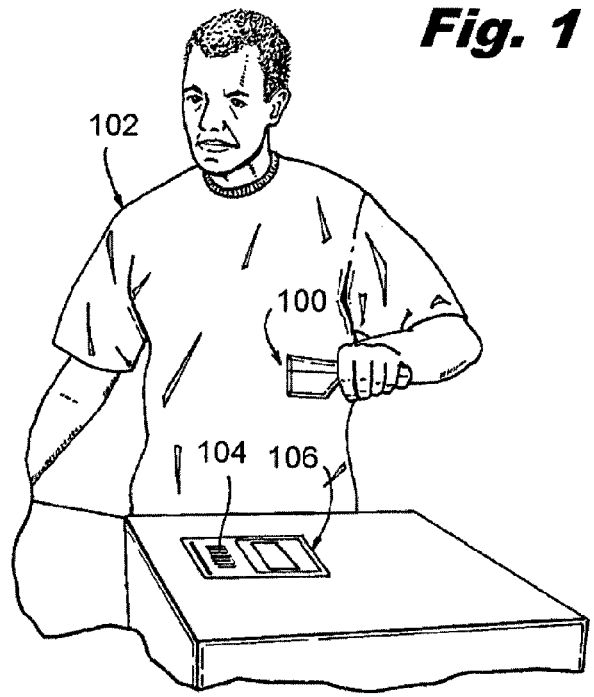
FIG. 1 is a perspective view of a user operating an image scanning device.

It is to be appreciated the subject invention is described below more fully with reference to the accompanying drawings, in which an illustrated embodiment of the present invention is shown. The subject invention is not limited in any way to the any particular illustrated embodiment as the illustrated embodiments are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below include a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host device, regardless of whether the implementation is in hardware, firmware or as a software computer product available on a disc, a memory storage device, or for download from a remote machine. The embodiments described herein include such software to implement the equations, relationships and algorithms described herein. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

DETAILED DESCRIPTION

Figure 2:
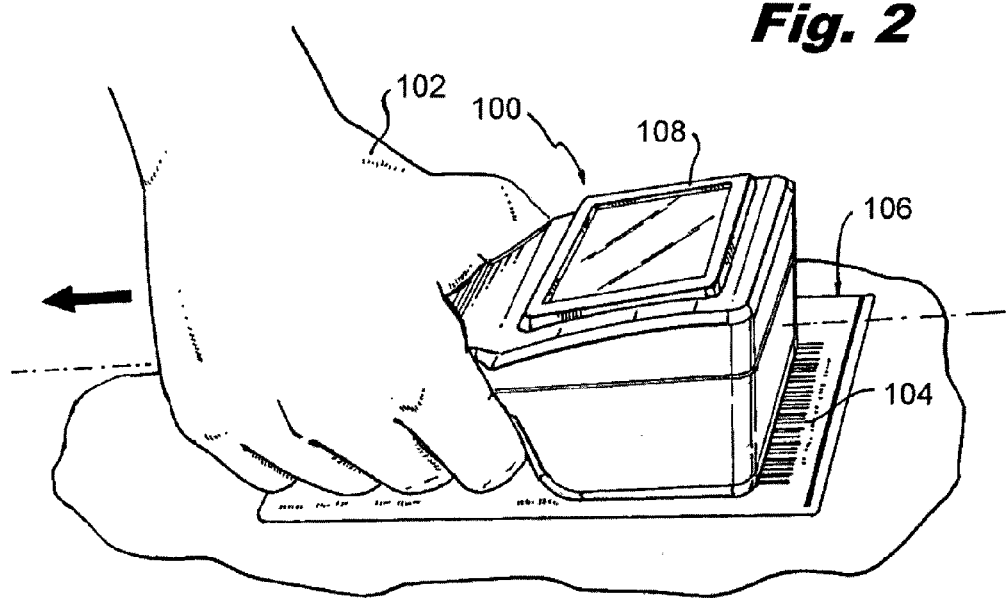
FIG. 2 is an enlarged view of the image scanning device of FIG. 1.

Referring to FIGS. 1 and 2, an image scanning device 100 is depicted. The image scanning device 100 in one example is a handheld image scanning device. In one embodiment, the image scanning device 100 is a handheld verifier suitable for inspecting barcodes, printed graphics, or optical characters.

The handheld verifier may be utilized by user 102 to scan an image 104, such as a barcode, to verify the printing accuracy of the image. In one embodiment, the image 104 is a one dimensional bar code. In another embodiment, the image is a two-dimensional barcode. In another embodiment, the image is a graphic package design. In another embodiment, the image is a text document . . . . In one embodiment, the barcode 104 is printed on an object 106. In another embodiment, the barcode is appended to the object, e.g. as a label. In one embodiment, the object 106 is a package, a container, a good, etc. In another embodiment, the object 106 is means for conveying information, such as paper, plastic, ceramic, cardboard, or an electronic output device (e.g. computer monitor, mobile device screen, tablet computer screen, etc.). In operation, the user 102 scans the image 104 by moving the image scanning device 100 over the image 104.

Image scanning device 100 includes a screen 108. The screen 108 in one example is an input/output device, such as touchscreen. Screen 108 allows image scanning device 100 to output data regarding scanning operations to the user as well as receive input from the user. Examples of possible output data would be an audible alarm, visual light indicator, external printed report, computer monitor, mobile device screen, or table computer screen and examples of possible input devices would be a touch screen, interface buttons (mechanical, optical, or capacitive), computer keyboard, or computer mouse.

Figure 3:
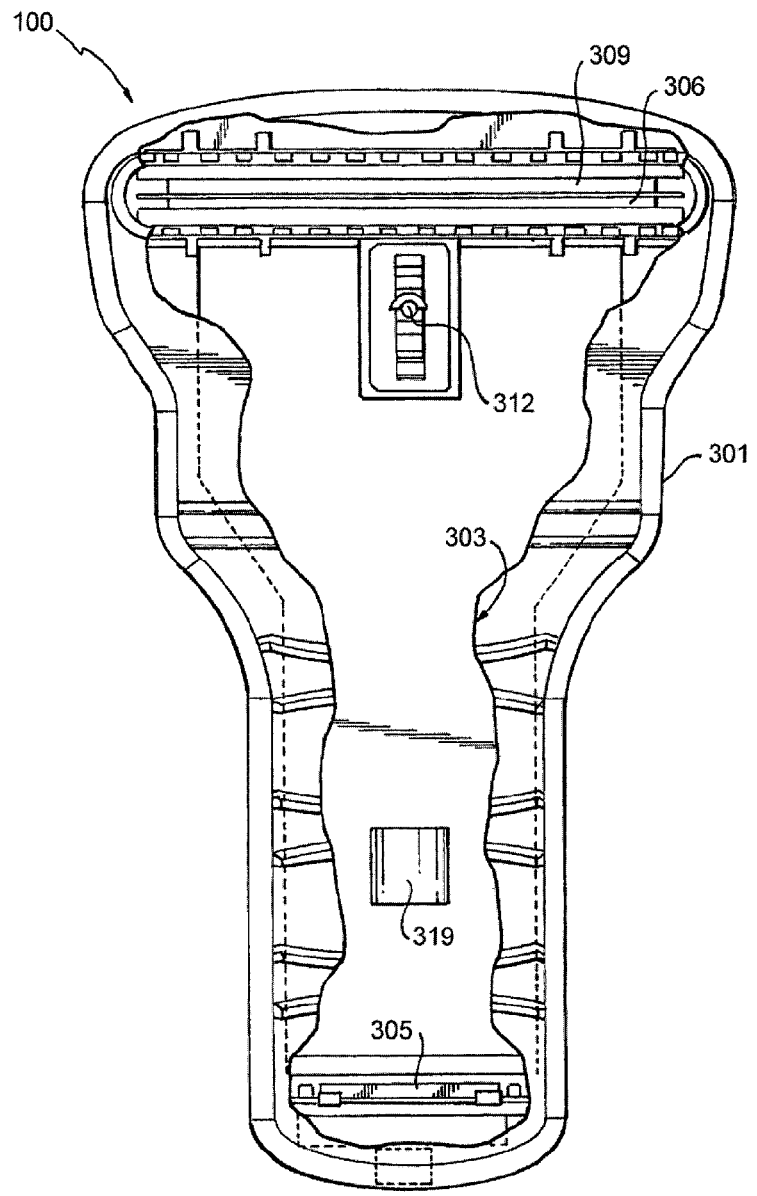
FIG. 3 is a cut away view of the bottom of the image scanning device of FIG. 1.

Referring to FIG. 3, image scanning device 100 in one embodiment comprises a housing 301, an image scanning module 303, and functional components that will be further discussed herein.

Housing 301 in one embodiment is constructed of extruded or injection molded plastic, extruded or cast metal. Housing 301 in one example is a sealed airtight enclosure to prevent particulate matter in the air from entering housing 301 and disturbing image scanning module 303.

Figure 4:
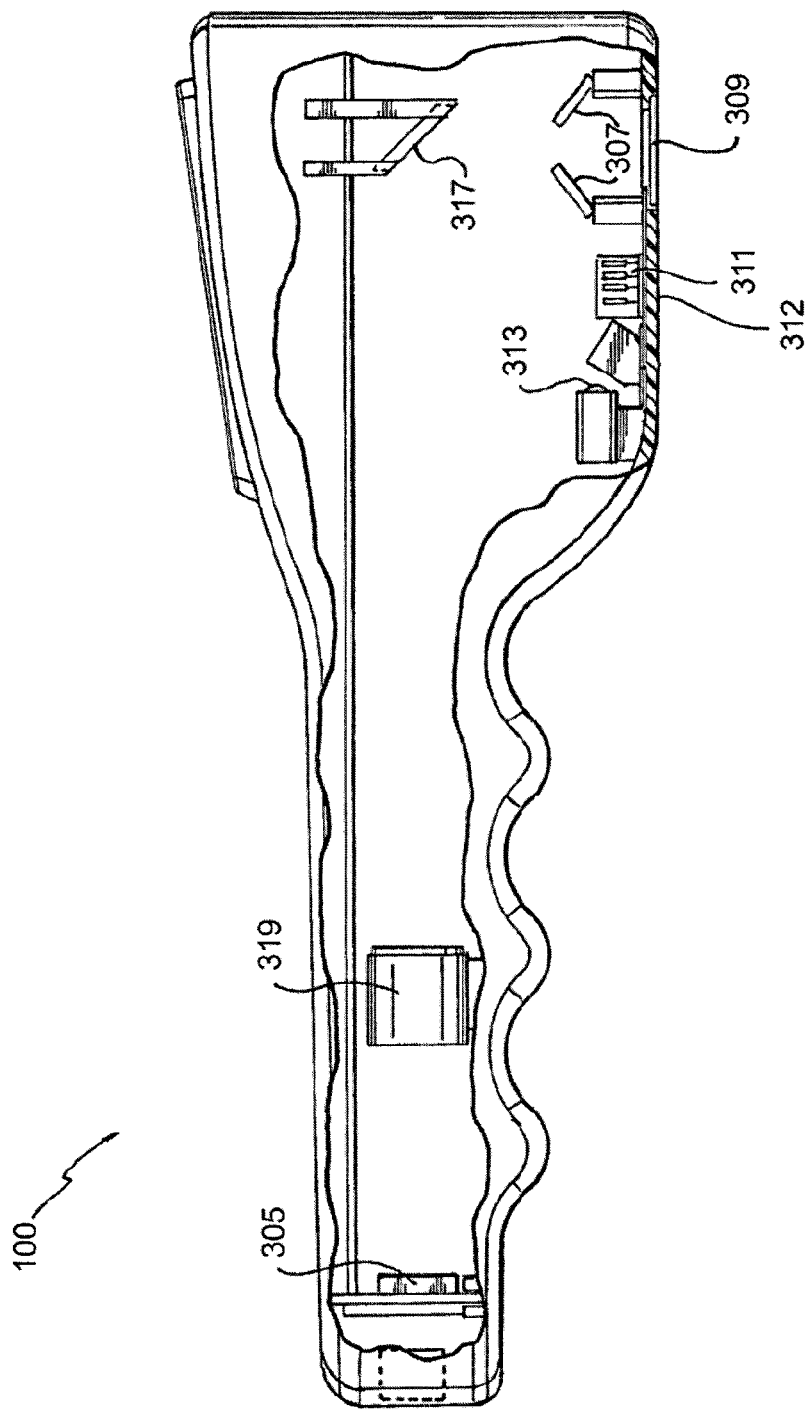
FIG. 4 is a cut away view of the side of image scanning device of FIG. 1.

Referring to FIGS. 3-4, image scanning module 303 in one embodiment comprises first image sensor 305 (e.g. a linear CCD device), lens 319 (e.g. a precision optical lens), mirror 317 (redirects sample light path), first image sensor illumination source 307 (e.g. wide length LED bars flooding the sample area in light with individually adjustable LEDs to allow for uniform illumination along the entire sample area), first image sensor sample area 309 (area when printed sample is captured), second image sensor 311 (e.g. a low resolution area CMOS or CCD device), a lens [not shown but located below or underneath second image sensor 311 (e.g. a plastic lens that directs light to and from second image sensor 311), second image sensor illumination source 313 (e.g. LED illumination), and second image sensor sample area 312 (area where motion is detected).

From a functional viewpoint, first image sensor 305, first image sensor illumination source 307, first image sensor sample area 309, mirror 317, and lens 319 comprise a first image capture module. Similarly, second image sensor 311, the lens (e.g. the plastic lens that directs light to and from second image sensor 311), second image sensor illumination source 313, and second image sensor sample area 312 comprise a second image capture module. In one embodiment, the first image capture module is utilized to capture images in one dimension. In one embodiment the second image capture module is utilize to capture images in two-dimensions.

In operation, the first image sensor illumination source 307 illuminates an area of a surface through first opening 306, thereby forming the first image sensor sample area 309. Light is reflected off the surface and received by mirror 317, which reflects the light and the corresponding image of the surface bounded by first image sensor sample area 309. Mirror 317 directs the light and corresponding image to through lens 319. Lens 319 forms and focuses the image and directs it to first image sensor 305. Image sensor 305 then captures the image, as will be further described herein.

Referring further to FIGS. 3-4, in one embodiment, the second image sensor illumination source 313 illuminates an area of a surface through second opening, thereby forming the second image sensor sample area 312. Light is reflected off the surface and through the lens (not shown) which forms and focuses the image and directs it to second image sensor 311. Image sensor 311 then captures the image, as will be further described herein.

Figure 5:
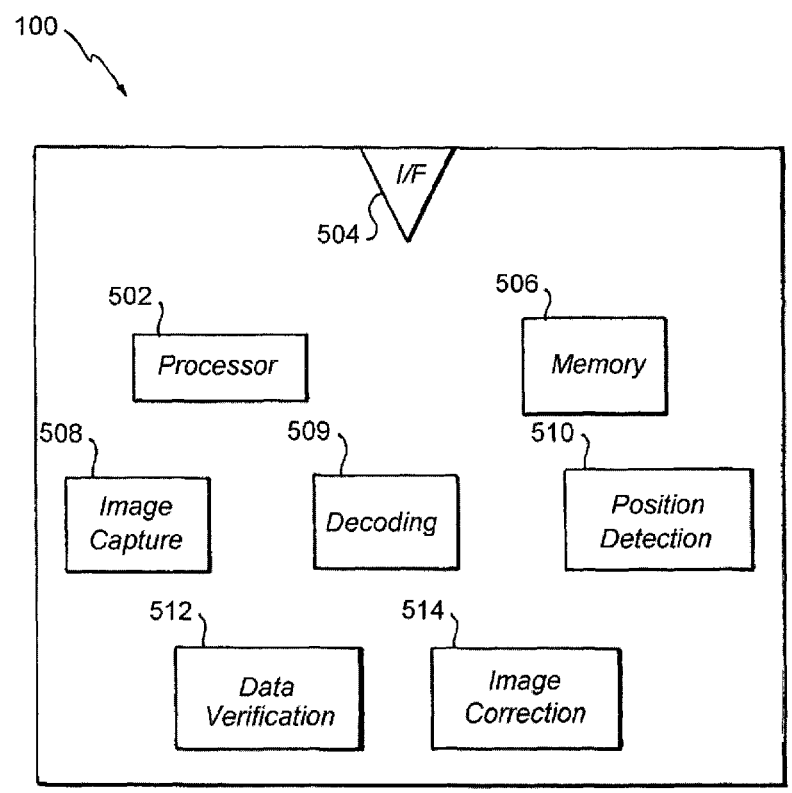
FIG. 5 is a functional block diagram of the image scanning device of FIG. 1.

Referring to FIG. 5, an exemplary functional block diagram of image scanning device 100 is now provided for illustrative purposes. It should be understood that image capture device 100 generally include at least one processor 502, at least one data interface 504, and at least one memory device 506 coupled via buses. Image scanning device in one embodiment also includes image capture engine 508, decoding engine 509, position detection engine 510, data verification engine 512, and image correction engine 514.

Processor 502 is an electronic device configured of logic circuitry that responds to and executes instructions. The processor 502 could comprise more than one distinct processing device, for example to handle different functions within image scanning device 100. Processor 502 outputs results of an execution of the methods described herein.

At least one data interface 504 in one embodiment comprises either a wired (e.g. USB or Ethernet or RS-232) or wireless (e.g. 802.11 or Bluetooth) data interface through which image scanning device may be coupled to a network, another device, such as a PC, or to a peripheral device, such as a printer.

Memory device 506 in one example is a computer-readable medium encoded with a computer program. Memory device 506 stores data and instructions that are readable and executable by processor 502 for controlling the operation of processor 502. Memory device 506 may be implemented in a random access memory (RAM), volatile or non-volatile memory, solid state storage devices, magnetic devices, a hard drive, a read only memory (ROM), or a combination thereof.

Image capture engine 508 in one example comprises hardware and/or software components programmed to image capture operations as further set forth herein. Decoding engine 509 comprises hardware and/or software components programmed to perform decoding operations as further set forth herein. Position detection engine 510 in one example comprises hardware and/or software components programmed to perform position detection 510 operations as further set forth herein. Data verification engine 512 in one example is used to perform data verification operations as further set forth herein. The term "engine" is used herein to denote a functional operation that may be embodied either as a stand-alone component or as an integrated configuration of a plurality of subordinate components. Thus, image capture engine 508, decoding engine 509, position detection engine 510, data verification engine 512, and image correction engine 514 may be implemented as a single module or as a plurality of modules that operate in cooperation with one another. Image capture engine 508, decoding engine 509, position detection engine 510, data verification engine 512, and image correction engine 514 may be implemented as software, hardware (e.g., electronic circuitry), firmware, software, or a combination thereof. In one example, image capture engine 508, decoding engine 509, position detection engine 510, data verification engine 512, and image correction engine 514 are software instructions that are stored on memory device 506. In another example, engines 508, 509, 510, 512, 514 are stored elsewhere and communicated to image capture device 100 for execution as part of a distributed processing environment.

Further referring to FIG. 5, image capture engine 508 in one example comprises hardware and/or software components to perform image capture operations. For instance, in one example, a user may actuate image scanning device 100 through its user interface to capture an image from a surface. Image capture engine 508, in response to such user actuation, would instruct one or both of the image sensors 305, 311 to capture one or more images. In another example, a user may actuate image scanning device 100, and in response, image capture engine 508 would instruct second image sensor 311 to begin capturing images such that position detection of image scanning device 100 could occur. Image correction 514 may also process the image to apply a synthetic (non-optic) aperture (size of light) when instructed by the Processor 502. The aperture is a method of grouping a number of pixels together in the shape of either a square, a rectangle, a circle, or an eclipse. The grouping maybe any size up to the maximum image width of the first image sensor. The size of the aperture would be determined by the processor 502 based on the type of sample inspection selected and the applicable local and international standards that apply to quality inspection testing of said sample.

Figure 8:
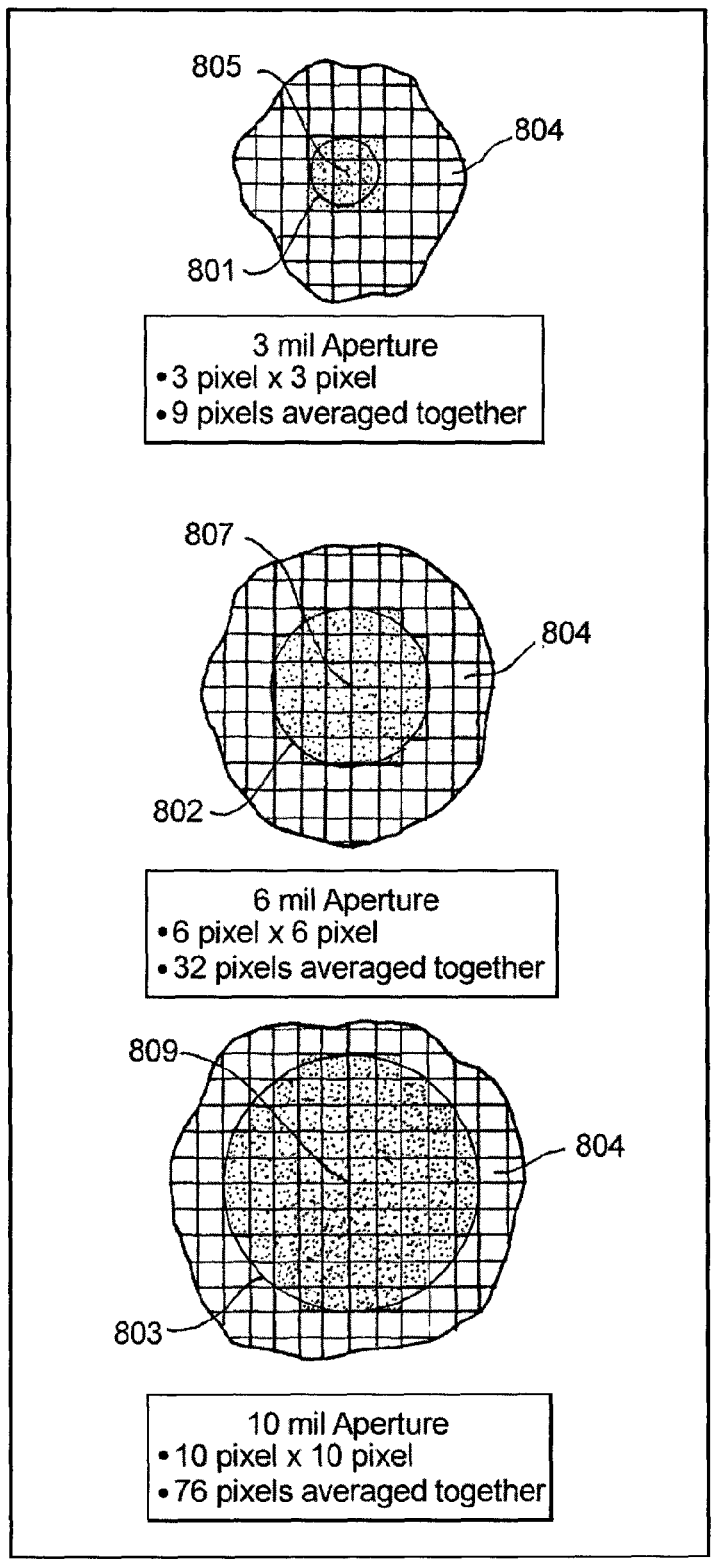
FIG. 8 is a diagram depicting exemplary aperture sizes for the image scanning device of FIG. 1.

For example, referring to FIG. 8, the size of the aperture 801 (i.e. area captured by first image capture module) can be controlled by using hardware (e.g. through adjustment of lens 319), software, or both hardware and software to control the aperture 801 of first image scanning module. Controlling the aperture 801 through hardware may be accomplished in one example by varying the physical characteristics of the lens 319. A higher resolution lens will provide first image capture module with a smaller aperture. A lower resolution lens will provide first image capture module with a larger apertures as is show in 802 and 803.

Software control of aperture 801 can be accomplished through applying an appropriate algorithm to the data that is captured by first image sensor 305. In one example, the aperture resolution is controlled by applying a smoothing function to the data captured by first image sensor 305. In the example shown in FIG. 8, each pixel 804 (each square represents a pixel captured by first image sensor 305) has an area of 1/1000 or 0.001 of an inch. When the "software aperture" is applied, the system will determine the software aperture and then process the image captured by sensor 305 to generate a second "smoothed" image. The second image will comprised of the values of each pixel is averaged with the values of its neighbors to create a composite pixel value. Therefore, to have a 3 mil aperture 805, image sensor 305 must capture 3 pixels in the X and 3 pixels in the Y direction resulting in a synthetic aperture of 0.003 inches. In example 807 which is for a semi-circular smoothing function, the image sensor must capture 6 pixels in the X and 6 pixels in the Y directions (36 pixels total but only 32 pixels are used to create the semi-circular smoothing pattern) resulting in a synthetic aperture of 0.006 inches. To have a 10 mil aperture 809, image sensor must capture 10 pixels in the X and 10 pixels in the Y directions (100 pixels total but only 76 pixels are used to create the semi-circular pattern) resulting in a synthetic aperture of 0.010 inches. The examples shown above are for illustration purposed only, any size or shape (square, rectangle, circular, or eclipse) software aperture can be applied, Decoding engine 509 comprises hardware and/or software components programmed to perform decoding operations on data received from the image sensors 305, 311. For instance, as light is reflected as a binary grey-scale from a one dimensional barcode there will be a series of light areas and dark areas within images captured by first image sensor 305. Decoding engine 509 will translate the light areas into either a high level digital value and the dark areas into the opposite low level digital value. In another example, decoding engine 509 will translate the images received from second image sensor 311 as a pattern that will be used in future captures to determine the position change of image scanning device 100.

Position detection engine 510 comprises hardware and/or software components programmed to perform position detection operations on data received from second image sensor 311. In one embodiment position detection engine 510 utilizes data received from second image sensor 311 (through decoding engine 509) to determine the position of image scanning device 100 relative to a surface.

Figure 6:
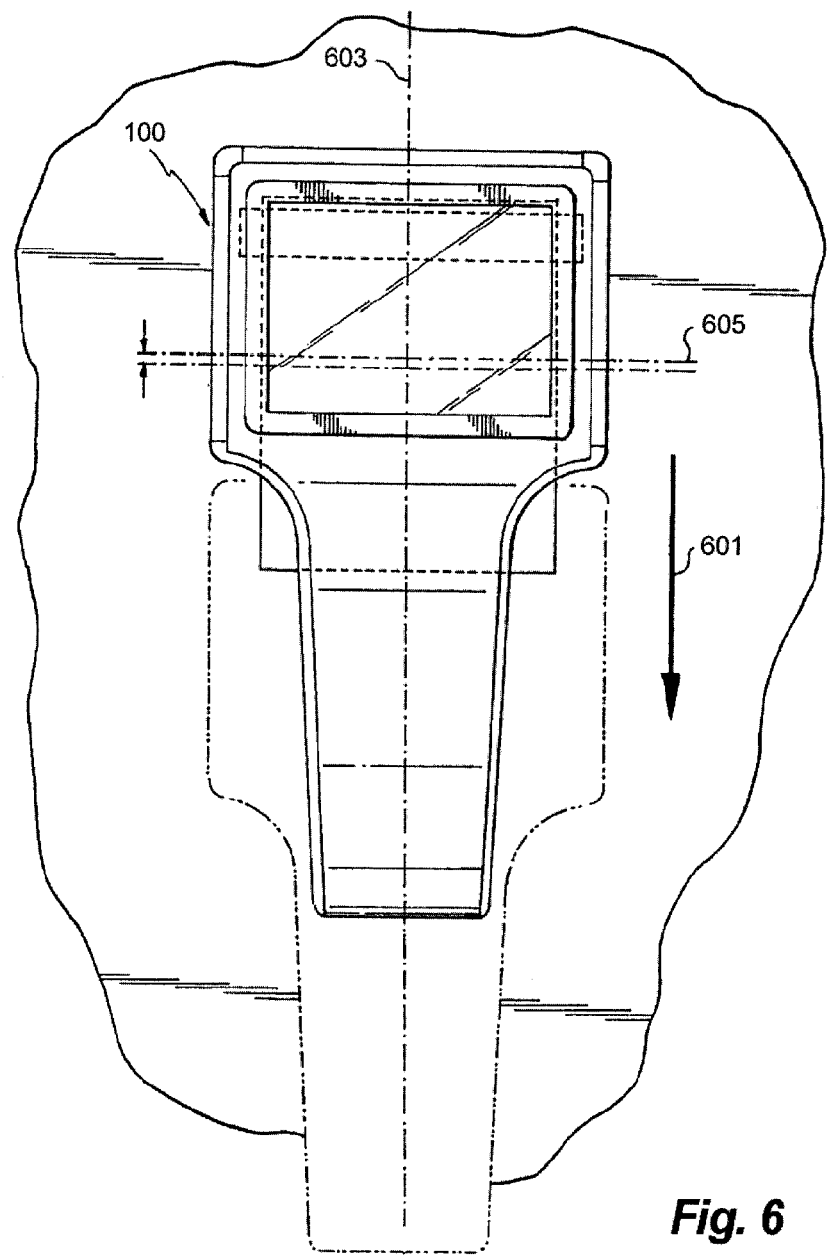
FIG. 6 is a diagram demonstrating exemplary image capture by the image scanning device of FIG. 1.

For instance, referring to FIG. 6, as a user scans an image by moving image scanning device 100 along an inspection path 601 (FIG. 6). Image capture engine 508 instructs second image sensor 311 to capture images from second image sensor sample area 312 at a fixed time internal. Second image sensor 311 captures images, which are decoded by decoding engine 509 into binary grey scale signals. Position detection engine 510 analyzes the images embodied in the binary grey scale signals and based on changes in the images over time determines how far the image capture device 100 has moved along the Y-axis 603. In one embodiment, when position detection engine 510 determines that image capture device 100 has moved a certain distance along the Y-axis 603, position detection engine 510 notifies image capture engine 508, which instructs the first image sensor 305 to capture an image along the X-axis 605. In one example, the distance that image capture device 100 moves to trigger image sensor 305 to capture an image along the Y-axis 603 is $1/1000^{th}$ of inch. In another example, the image trigger distance can be set from $1/50^{th}$ of an inch to $1/5000^{th}$ of an inch. In this manner, a one-dimensional image, such as a one dimensional barcode, can be captured by scanning the image capture device 100 along at least a portion of the barcode in the direction of the Y-axis 603. In this manner, a two-dimensional image, such as a two-dimensional barcode can be captured by scanning the image capture device along the entire barcode in the direction of the Y-axis 603. In this manner, a two-dimensional image, such as printed package, can be captured by scanning the image capture device along length of the package in the direction of the Y-axis 603.

Data verification engine 512 comprises hardware and/or software components programmed to perform data verification operations on data received from first image sensor 305. For instance, image data received from first image sensor 305, through decoding engine 509 is received by data verification engine 512. Data verification engine 512 processes the image data of the inspection area using industry standards to generate inspection results that show the quality level of the image captured. The inspection results will be reported in the format matching the type of inspection performed, this may be; 0-100 scale, A-F scale, 0.0 to 4.0 scale, or absolute dimensional measurements depending on the applicable industry standard. In one example, the image data is verified in accordance with ISO/IEC 15426-1 (for linear bar code verifiers) and ISO/IEC 15426-2 (for two dimensional bar code verifiers). Because image capture device 100, as described above, is able to capture two-dimensional images, image capture device 100 can be utilized to verify both one-dimensional and two-dimensional barcodes.

Figure 7A:
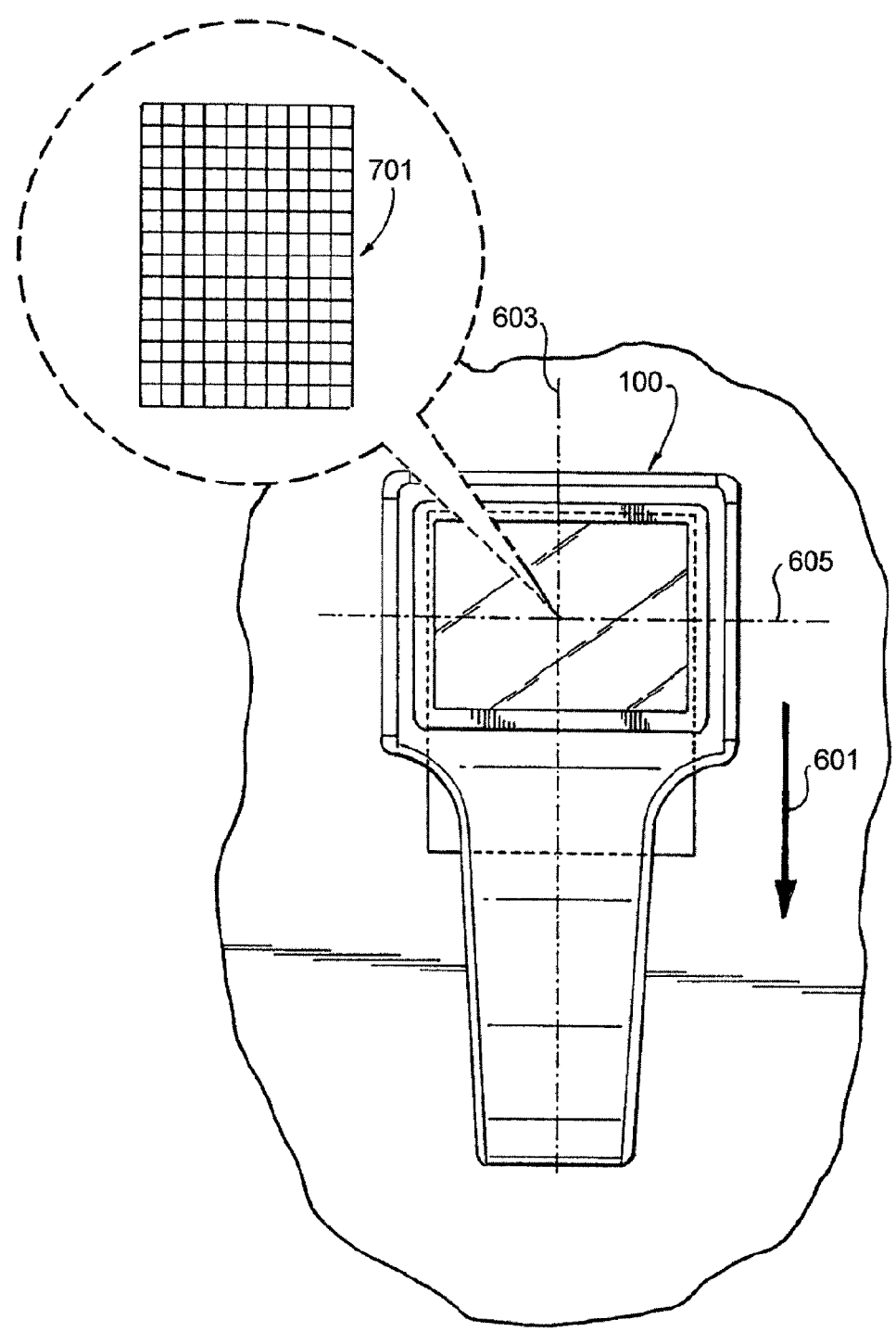
FIG. 7A-7C are diagrams demonstrating exemplary image correction by the image capture device of FIG. 1.
Figure 7B:
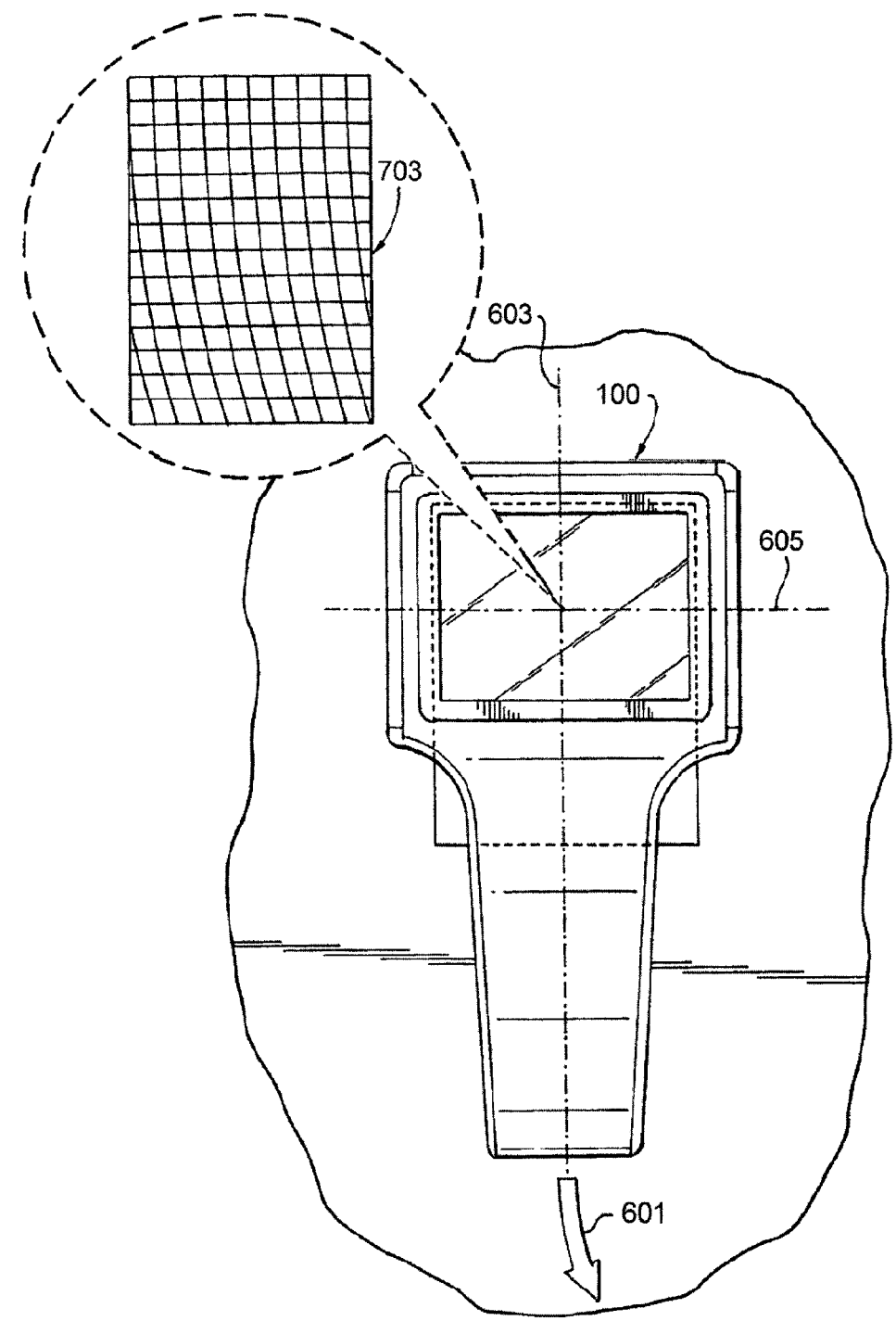
Figure 7C:
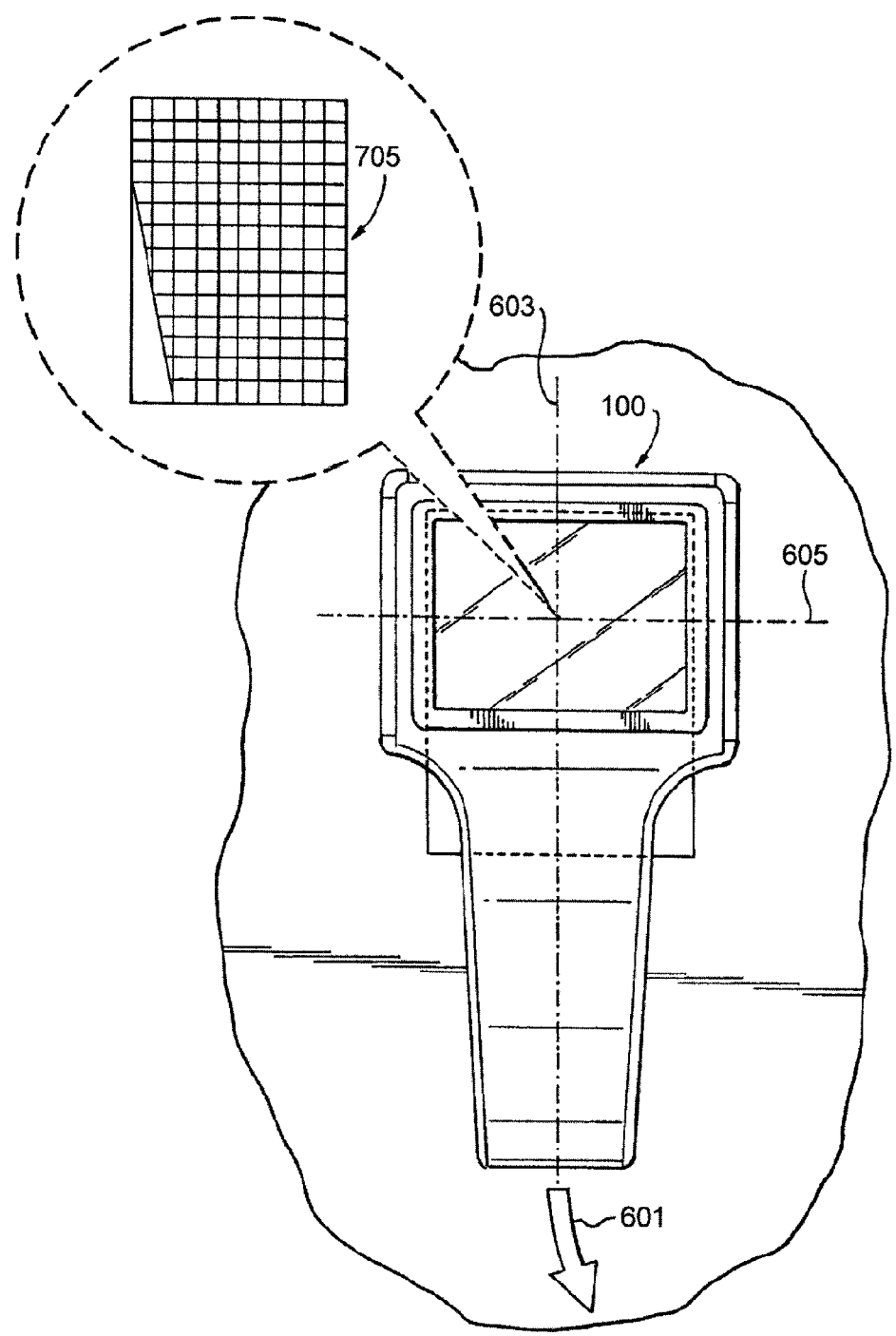

Referring to FIGS. 7A-7C, a detailed description of exemplary operation of image correction engine 514 is now provided for illustrative purposes. In FIG. 7A, it can be seen that a user moves image scanning device 100 along inspection path 601 in a "straight" fashion. Image scanning device 100 does not rotate about its central axis during such movement. As a result, in FIG. 7A, the resultant image 701, captured by image capture device 100 is an accurate depiction of image 104 (FIG. 1), i.e. what passes through first image sensor sample area 309. There are no defects in the image 701.

In FIG. 7B, however, it can be seen what results when user error causes the image capture device 100 to rotate or when the inspection path 601 is not parallel to the Y-Axis 603. When this occurs, the resultant image 703 contains a defect, or distortion of image 104 (FIG. 1), i.e. what passes through first image sensor sample area 309. It is skewed relative to the image 104.

Accordingly, referring to FIGS. 7B-7C, image scanning device 100 performs error correction on resultant image 703 to remove errors, such as skew.

The movement detected in the Y-axis 603 by the second image sensor 311 and processed by capture engine 508 would be used to instruct first image sensor 305 to capture image 104. The image 703 captured by first image sensor 305 would be processed by the image correction engine 514 using movement along the X-axis 605 as detected by second image sensor 311 and processed by capture engine 508. In one embodiment, this image correction is completed in hardware to reduce the processor 502 workload and increase the maximum image capture rate. However, alternatively the image correction could be completed by processor 502.

The image correction engine 514 compares the amount of error (e.g. the distance of skew) to a threshold. There are two thresholds, one for the maximum amount of error over each individual image sample and a second for the maximum amount of error over an entire inspection area. If the amount of error exceeds a pre-programmed threshold, then an alert is triggered and the user is instructed to rescan the image 104. If the amount of error is less than the threshold, then the image correction engine 514 corrects the resultant image 703. The image correction engine 514 in one example corrects for the defect, by cropping or shifting the resultant image 703, thereby yielding a corrected image 705. For instance, if a user, while scanning an inspection area, were to shift the image scanning device by X pixels along the X axis, then the image correction engine 514 would shift the image by X pixels in the opposite direction along the X axis.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. An image scanning apparatus comprising:
 a housing;
 a first image sensor attached at a first position along the housing, the first image sensor being configured and adapted to scan an image; and
 a second image sensor attached at a second position along the housing, the second image sensor being configured and adapted to scan an image to detect movement of the apparatus in the X and Y axis; wherein the movement in the Y axis of the apparatus as detected by the second image sensor is utilized to trigger the first image sensor.

2. The image scanning apparatus of claim 1, wherein the first image sensor is a one-dimensional image sensor.

3. The image scanning apparatus of claim 1, wherein the first image sensor is a linear scan image sensor.

4. The image scanning apparatus of claim 1, wherein the second image sensor is a two-dimensional image sensor.

5. The image scanning apparatus of claim 1, wherein the second image sensor is an area scan image sensor.

6. The image scanning apparatus of claim 1, further comprising an illumination source associated with the first imaging sensor.

7. The image scanning apparatus of claim 1, further comprising an illumination source associated with the second imaging sensor.

8. The image scanning apparatus of claim 1, further comprising at least one aperture associated with the first and second imaging sensor.

9. The image scanning apparatus of claim 8, wherein the at least one aperture is a variable aperture.

10. The image scanning apparatus of claim 8, wherein the at least one aperture is an optical aperture.

11. The image scanning apparatus of claim 8, wherein the at least one aperture is a software aperture.

12. The image scanning apparatus of claim 8, wherein the aperture is a combination software and optical aperture.

13. The image scanning apparatus of claim 1, wherein the housing is a sealed unit containing the first and second image sensors.

14. An image scanning apparatus, comprising:
 a housing;
 a first image sensor attached at a first position along the housing, the first image sensor being configured and adapted to scan an image;
 a second image sensor attached at a second position along the housing, the second image sensor being configured and adapted to scan an image and to detect movement of the apparatus in the X and Y axis during a scan of an image by both the first and second image sensors;
 at least one aperture along a portion of the housing, the at least one aperture being associated with at least one of the first image sensor and the second image sensor; and
 at least one illumination source attached to the housing, the at least one illumination source being associated with the at least one of the first image sensor and the second image sensor.

15. The image scanning apparatus of claim 14, wherein the at least one aperture comprises a first aperture associated with the first image sensor and a second aperture associated with the second image sensor.

16. The image scanning apparatus of claim 14, wherein the first image sensor is a one-dimensional image sensor.

17. The image scanning apparatus of claim 14, wherein the second image sensor is a two-dimensional image sensor.

18. The image scanning apparatus of claim 14, wherein the second image sensor is an area scan image sensor.

19. A method, comprising:
 scanning an image to obtain a first scanned image and a second scanned image;
 comparing the first scanned image to the second scanned image;
 determining an amount of deviation on the X axis and Y axis between the first scanned image and the second scanned images; and adjusting a linear image sensor scanned image to correct any deviation found in the X axis.

20. The method of claim 19, further comprising:
comparing the amount of deviation in the X axis for a single linear image sensor scanned image against a maximum deviation limit; and
generating an alert if the amount of deviation exceeds the maximum deviation limit.

21. The method of claim 19, further comprising:
comparing the amount of deviation in the X axis for the collection of individual linear image sensor scanned images that create the 2D inspection area, against a maximum deviation limit.

22. The method of claim 19, wherein the first image sensor is a one-dimensional image sensor.

23. The method of claim 19, wherein the first image sensor is a linear image sensor.

24. The method of claim 19, wherein the second image sensor is a two-dimensional image sensor.

25. The method of claim 19, wherein the second image sensor is an area scan image sensor.

26. A method, comprising:
scanning an image by a first image sensor to obtain an uncorrected scanned image;
scanning the image by a second image sensor to obtain a distance of scan and skew profile of the first scanned image; and
comparing sequential scanned images by the second image sensor to collect the skew data to yield a skew deviation.

27. The method of claim 26, further comprising:
comparing the skew deviation against a maximum deviation limit; and
generating an alert if the skew deviation exceeds the maximum deviation limit.

28. The method of claim 26, further comprising adjusting the uncorrected scanned image by the skew deviation to yield a corrected scanned image.

29. An image scanning device for verifying accuracy of a printed area, the image scanning device comprising:
a housing;
an image scanning engine attached to the housing, the image scanning module being operative to scan an image that is utilized to represent a data value;
a decoding engine configured to decode the scanned image to yield data about the image;
an image verification engine configured that utilizes the data to verify that the image accurately reflects the data value, wherein the image is one of a one-dimensional and two-dimensional barcode, the image verification module is operable to verify accuracy of both one-dimensional and two-dimensional barcodes in compliance with ISO, GS1, other industry standards, or other testing methodologies.

30. An image scanning device for verifying accuracy of an area of text, the image scanning device comprising:
a housing;
an image scanning engine attached to the housing, the image scanning module being operative to scan an image that is utilized to represent a data value;
a decoding engine configured to decode the scanned image to yield data about the image;
an image verification engine configured that utilizes the data to verify that the image accurately reflects the intended data value; and
an adaptable aperture a size of which the image scanning engine configures in response to the data about the image and the image is one of a one-dimensional and two-dimensional barcode, the image verification engine is operable to verify accuracy of both one-dimensional and two-dimensional barcodes in compliance with ISO, GS1, other industry standards, or other testing methodologies.

31. An image scanning device for verifying accuracy of a printed area, the image scanning device comprising:
a housing;
an image scanning engine attached to the housing, the image scanning module being operative to scan an image that is utilized to represent a data value;
a decoding engine configured to decode the scanned image to yield data about the image;
an image verification engine that utilizes the data to verify that the image accurately reflects the intended data value; and wherein the image scanning module and the image verification module is operable to verify the accuracy of printed text in multiple character sets (including but not exclusive to ISO-8859, ISO-8859-2, ISO-8859-5, ISO-2022-jp character sets) in compliance with ISO, other industry standards, or other testing methodologies.

32. An image scanning device for verifying accuracy of a printed area, the image scanning device comprising:
a housing;
an image scanning engine attached to the housing, the image scanning module being operative to scan an image that is utilized to represent a data value;
a decoding engine configured to decode the scanned image to yield data about the image;
an image verification engine configured that utilizes the data to verify that the image accurately reflects the intended data value; and wherein the image scanning module and the image verification module is operable to verify the accuracy of both printed graphics and printed artwork in compliance with ISO, other industry standards, or other testing methodologies.

* * * * *